United States Patent [19]

Jones et al.

[11] Patent Number: 5,138,709
[45] Date of Patent: Aug. 11, 1992

[54] SPURIOUS INTERRUPT MONITOR

[75] Inventors: Randall L. Jones; Mark R. Heene; Mark W. McDermott, all of Austin, Tex.

[73] Assignee: Motorola, Inc., Schaumburg, Ill.

[21] Appl. No.: 508,214

[22] Filed: Apr. 11, 1990

[51] Int. Cl.⁵ .............. G06F 9/46; G06F 11/00; G06F 13/00

[52] U.S. Cl. ............ 395/575; 364/DIG. 1; 364/242.6; 364/242.8; 364/242.92; 364/262.2; 364/263.2; 364/265; 371/12

[58] Field of Search .......... 364/200, 900, DIG. 1, 364/DIG. 2; 371/71, 12; 395/575

[56] References Cited

U.S. PATENT DOCUMENTS

| | | | |
|---|---|---|---|
| 3,944,975 | 3/1976 | Yasumoto et al. | 371/71 |
| 4,349,873 | 9/1982 | Gunter et al. | 364/200 |
| 4,381,542 | 4/1983 | Binder et al. | 395/725 |
| 4,418,385 | 11/1983 | Bourvez | 364/200 |
| 4,620,278 | 10/1986 | Ellsworth et al. | 364/200 |
| 4,727,477 | 2/1988 | Gavril | 364/200 |
| 4,764,893 | 8/1988 | Karabatsos | 364/900 |
| 4,799,148 | 1/1989 | Nishioka | 364/200 |
| 4,837,677 | 6/1989 | Burrus, Jr. et al. | 364/200 |
| 4,872,004 | 10/1989 | Bahnick et al. | 364/200 |
| 4,939,644 | 7/1990 | Harrington et al. | 364/200 |
| 4,969,120 | 11/1990 | Azevedo et al. | 364/200 |

Primary Examiner—Michael R. Fleming
Assistant Examiner—Ayaz R. Sheikh
Attorney, Agent, or Firm—Jonathan P. Meyer

[57] ABSTRACT

In a microprocessor system including arbitration for an interrupt, an apparatus and method for monitoring the arbitration lines to determine whether an interrupt request is real or spurious is includued. Once an interrupt acknowledge signal is provided, the interrupting apparatus must arbitrate for the interrupt slot. If no arbitration occurs the interrupt request was spurious and bus error is activated.

6 Claims, 5 Drawing Sheets

SPURIOUS INTERRUPT MONITOR

FIELD OF THE INVENTION

The present invention pertains to a spurious interrupt monitor and more specifically to a method and apparatus for monitoring interrupts to determine whether an interrupt is spurious or real.

BACKGROUND OF THE INVENTION

Microprocessor systems are constructed to provide a variety of tasks and to this end are equipped with a bus via which various peripheral devices, which may be within the microprocessor chip or external thereto and which will be referred to herein as modules, can demand the attention of the data processor in the microprocessor system. The signal with which a module demands attention is commonly referred to as an interrupt request signal (or an 'interrupt' for simplicity) since the external circuitry is asking the data processor to interrupt whatever it is currently doing in order to service more pressing external circuitry needs. The data processor services the interrupt by suspending whatever it is doing, executing a particular software program referred to as an interrupt handler, and then carrying on with its suspended operations. The key characteristic of an interrupt is that it is an unscheduled event, from the viewpoint of the data processor.

One prior art interrupt scheme is disclosed in U.S. Pat. No. 4,349,873, which is assigned to the assignee of the present invention and is hereby incorporated herein by reference. In system interrupts are presented to the data processor by means of an encoded value (which encodes a one-of-eight interrupt priority level) appearing on the three lines IPL0-IPL2. The data processor responds by executing an interrupt acknowledge bus cycle in order to retrieve from the interrupting module an interrupt vector (or an autovector indication). The disclosed data processor relies on externally provided hardware to perform arbitration between competing interrupting modules having the same interrupt priority level and to identify situations in which a false, or spurious, interrupt has been acknowledged.

A spurious interrupt occurs when the data processor executes an interrupt acknowledge cycle in response to an apparent interrupt request and no external circuitry responds with an interrupt vector or autovector indicator. Spurious interrupts can be caused, for example, by a noisy external environment. The data processor will stop and wait forever unless some kind of response is given to allow it to finish the interrupt acknowledge (IACK) cycle. In the system disclosed in the '873 patent, the data processor must be supplemented by external logic which identifies such situations and terminates the interrupt acknowledge cycle with a bus error (BERR) signal. Typically, such external logic simply waits for a predetermined length of time after the initiation of the interrupt acknowledge cycle before signalling a bus error. In many cases, this time-out period is the same as is used for all bus cycles to detect some error condition. During this time, no processing activity is occurring.

SUMMARY OF THE INVENTION

It is an object of the present invention to provide an improved apparatus and method for detecting spurious interrupts in microprocessor systems.

It is a further object of the present invention to improve the operation of microprocessor systems in real time environments and in noisy external environments.

These and other objects are realized in a method of sensing spurious interrupts in a microprocessor system including interrupt priority levels, an arbitration system and a bus error circuit, the method including the steps of monitoring the arbitration system for activity and activating the bus error circuit if no activity occurs during an interrupt acknowledge cycle.

These and other objects are further realized in a microprocessor system including interrupt processing apparatus with priority levels, an arbitration system and a bus error circuit which is activated by spurious interrupt signals and which further includes apparatus for detecting spurious interrupts comprising logic circuitry sensitive to predetermined bus state signals during an interrupt acknowledge cycle and providing an output signal to activate the bus error circuit during the predetermined bus state signals, said logic circuitry including an inhibit input terminal connected to prevent the output signal from being provided when an inhibit signal is applied thereto, an activity monitoring circuit connected to monitor the arbitration system for activity and supply an inhibit signal when activity occurs, and means coupling the inhibit signal to the inhibit input terminal of said logic circuitry for preventing said logic circuit from activating the bus error circuit when arbitration activity occurs during an interrupt acknowledge cycle.

DESCRIPTION OF THE PREFERRED EMBODIMENT

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false. In addition, the terms "set" and "clear" will be used when referring to the rendering of a status bit or similar apparatus into its logically true or logically false state, respectively.

Figure 1:
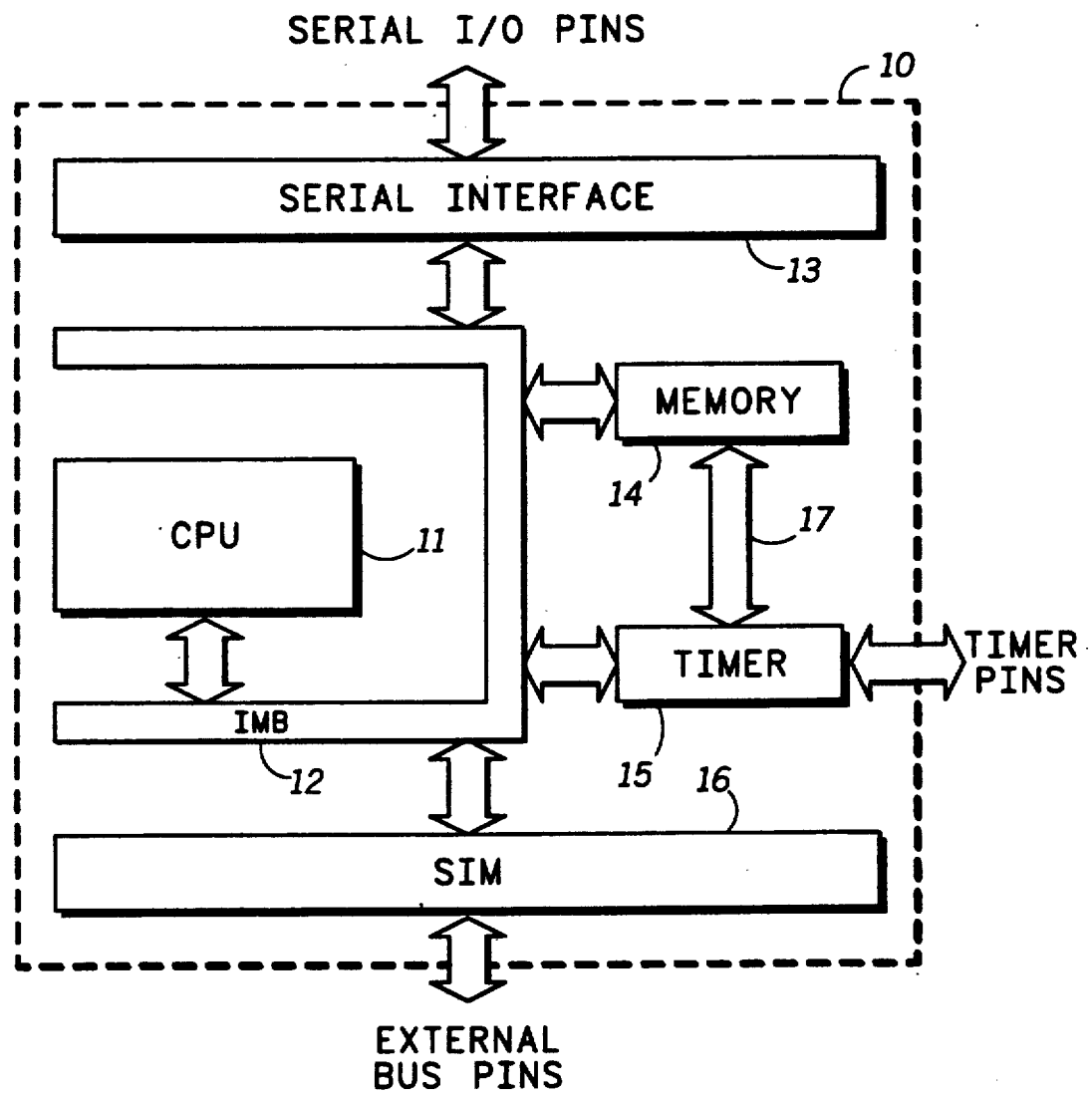
FIG. 1 is a block diagram of a microprocessor system embodying the present invention.

FIG. 1 illustrates an integrated circuit computing system according to a particular embodiment of the present invention. A microcomputer 10 comprises a central processing unit (CPU) 11, an inter-module bus (IMB) 12, a serial communication interface 13, on-board memory 14, a time module 15 and a system integration module (SIM) 16. Inter-module bus 12, which comprises multiple data, address and control signal lines as described in detail below, is coupled to and provides for communication between each of the other components of microcomputer 10. Serial interface 13 provides for synchronous and/or asynchronous serial data transfer between microcomputer 10 and external devices and systems by means of several serial I/O pins. Memory 14 provides storage space for software instructions and other data useful to microcomputer 10. Timer module 15 provides various timing functions such as input capture, output compare and the like by means of several timer pins and is coupled to memory 14 by means of an interface 17. SIM 16 provides an interface between IMB 12 and an external bus, the details of which are discussed below, and also provides certain system functions such as clock signal generation and distribution.

As is described in greater detail below, a seven level interrupt priority scheme and a bit-serial interrupt arbitration scheme are implemented through IMB 12. These schemes allow both the on-board peripheral modules and external peripheral modules to assert prioritized interrupt requests to CPU 11. On-board modules participate directly in the arbitration process while external modules are represented by SIM 16 during arbitration. A spurious interrupt monitor apparatus resides within SIM 16 and monitors the interrupt arbitration process which occurs on IMB 12 in order to detect spurious interrupts.

Figure 2:
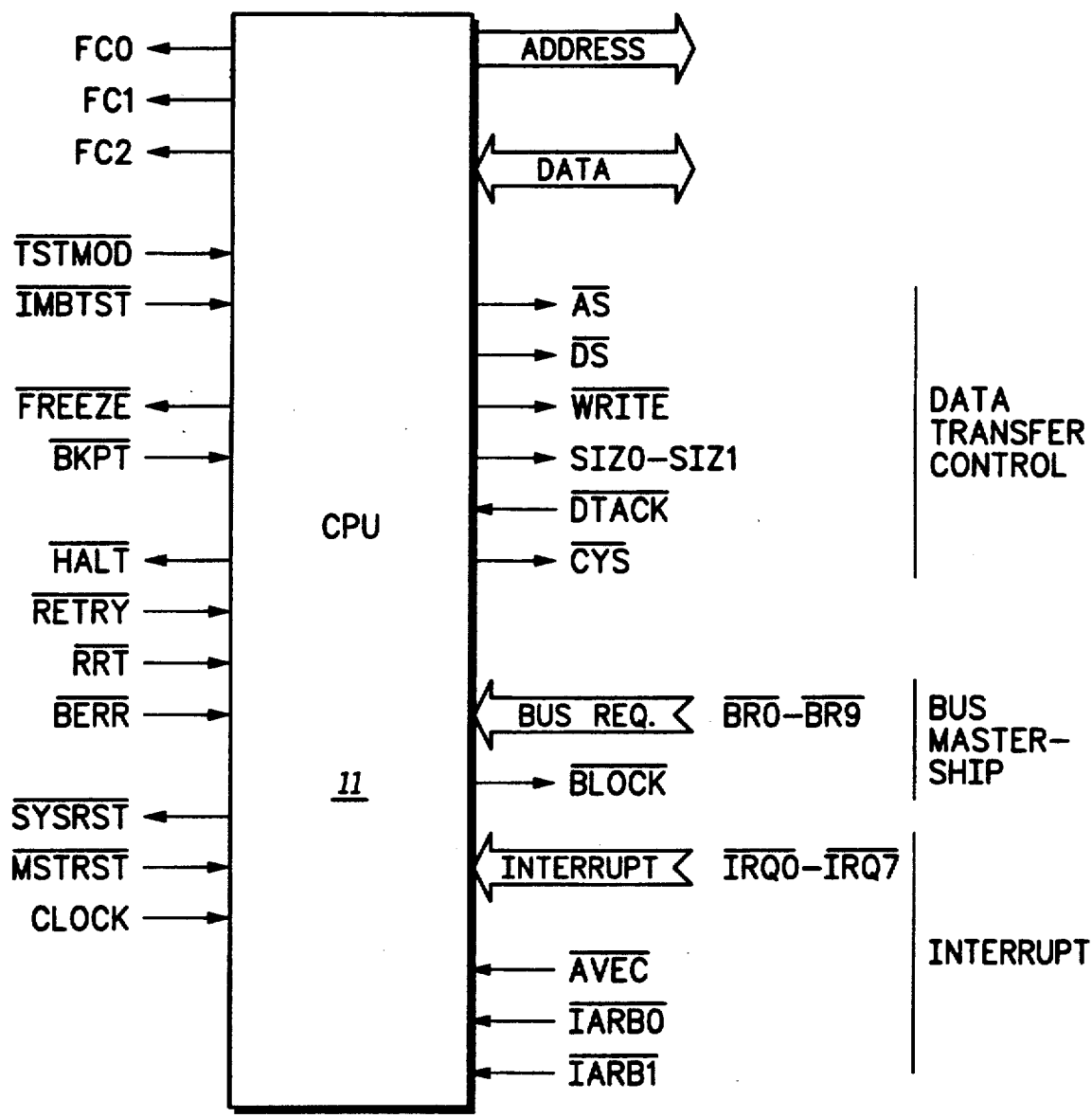
FIG. 2 is a block diagram of a data processor from FIG. 1 illustrating the input/output signals involved.

Referring specifically to FIG. 2, a block diagram illustrating the input/output signals supplied to CPU 11 are illustrated. With some variations, these signals will be familiar to users of microprocessors of the MC68000-family available from Motorola, Inc. of Austin, Tex. Only the signals of the group labelled INTERRUPT are of particular relevance to an understanding of the present invention.

Interrupt requests are received by CPU 11 by means of a seven-line prioritized interrupt request bus. The lines are labelled $\overline{IRQ1}$-$\overline{IRQ7}$. These lines are carried through SIM 16 to form a portion of the external bus, so that external modules may also assert prioritized interrupt requests. If any of these lines is held low (asserted) while CPU 11 is at an instruction boundary, an interrupt request may be recognized. The priority level of the interrupt request is determined by the most significant one of the interrupt request lines which is active. The interrupt priority for a particular interrupt source may be fixed at the time of the circuit design of that device or may be programmable by means of a register or similar structure within the device. If the priority of the requested interrupt is higher than a mask level which is represented by an interrupt mask field of a control register within CPU 11, then an interrupt acknowledge bus cycle will be executed by CPU 11, thus beginning the interrupt servicing process. Lower priority interrupt requests are ignored by CPU 11.

Since several modules of the same or different priorities may be requesting an interrupt simultaneously, some mechanism must be provided to identify the one module which will be serviced by CPU 11. This process is referred to as arbitration. The interrupt acknowledge bus cycle implements this process. During this cycle, CPU 11 controls IMB 12 (and, through SIM 16, the external bus) to execute a special bus cycle which all modules must be capable of recognizing as an interrupt acknowledge cycle. All of the function code signals are set to logic 1, as are address bits 16–19 of both IMB 12 and of the external bus. This identifies the cycle as an interrupt acknowledge cycle. The priority level of the interrupt being acknowledged (the highest requested level) is encoded onto address bits A1-A3 of both IMB 12 and the external bus. Modules which have not requested an interrupt may ignore the interrupt acknowledge cycle. Any requesting module whose priority is lower than that encoded onto A1-A3 will not participate further in the interrupt process (but must continue to assert their interrupt request so that it may be serviced later). All requesting modules whose priority level matches that of the acknowledged interrupt will participate in the next phase of the interrupt process: interrupt arbitration. At this point, a requesting external module no longer directly participates, but is represented by SIM 16 in the arbitration process.

Interrupt arbitration takes place during the initial portion of the interrupt acknowledge bus cycle. Interrupt arbitration uses the two lines labelled $\overline{IARB0}$ and $\overline{IARB1}$ to implement a bit-serial arbitration scheme. During the arbitration process, each participating module, or SIM 16 in the case of an external module, places a four-bit arbitration number ranging from 0 to 15 on $\overline{IARB0}$ and $\overline{IARB1}$ in a bit-serial fashion, alternating between $\overline{IARB0}$ and $\overline{IARB1}$. Each internal module has a unique arbitration number which, in the preferred embodiment, is programmable.

The $\overline{IARB0}$ and $\overline{IARB1}$ lines are precharged high and active low. That is, a low voltage level represents a one. A module wishing to place a one on these lines must pull the line low. A module wishing to place a zero on one of these lines need not do anything. Each arbitrating module first places the most significant bit of its arbitration number on $\overline{IARB0}$ at a specified time during the interrupt acknowledge cycle. If that bit is one, the module pulls $\overline{IARB0}$ low. If that bit is zero, the module does nothing. Next, each module examines $\overline{IARB0}$. If the most significant bit of a module's arbitration number is zero and the module senses that $\overline{IARB0}$ is low, then the module knows that some other module has a higher arbitration number and so will drop out of the arbitration process. Otherwise, the module will continue arbitrating. The process continues with each bit of the arbitration number being placed alternately on $\overline{IARB1}$ and $\overline{IARB0}$ until all fours bits have been placed. At this point, there will be only one module arbitrating and all other modules will have dropped out.

The module which wins the arbitration process will next either drive its interrupt vector onto the data bus and terminate the interrupt acknowledge cycle by asserting $\overline{DTACK}$ or assert avec to inform CPU 11 to internally generate an interrupt vector.

Figure 3:
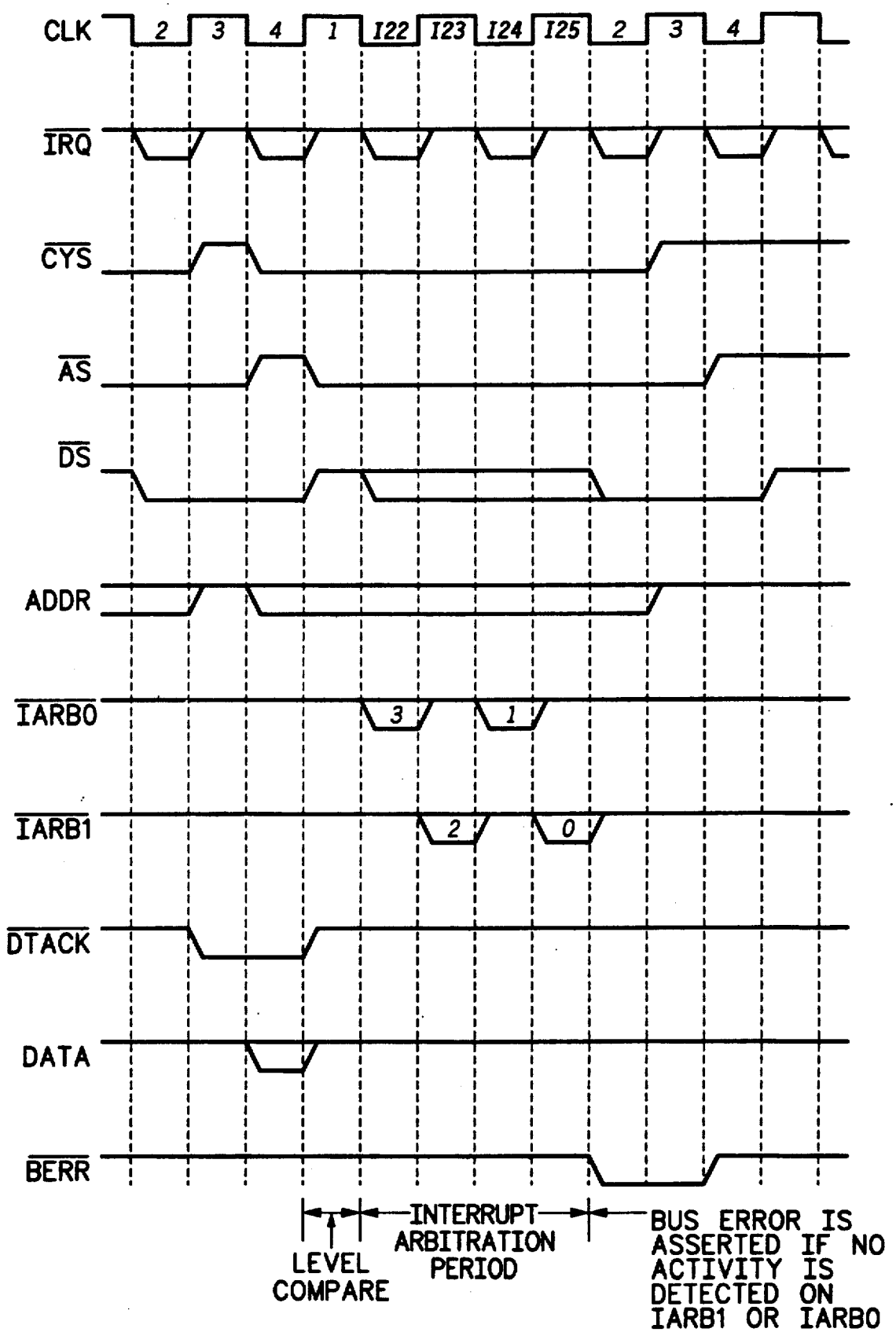
FIG. 3 is a timing diagram illustrating an interrupt acknowledge cycle with arbitration.

The process described above will be explained in more detail with reference to FIG. 3. For purposes of understanding, a "state" is a subunit of the bus cycle in which specific events occur. Each bus state has a duration of one clock tic and represents a single state within the controlling microengine. A clock "tic" is defined as the single high or low phase of a clock signal. Two tics equal a full clock cycle. The following describes the activity that occurs during each bus state of the IACK cycle.

CLK is the clock signal applied to CPU 12 with each tic numbered in accordance with the following explanation. IRQ is a composite of all the interrupt requests. At the beginning of the bus state 4 (the first tic designated 4 at the left of FIG. 3), CPU 12 will: assert cycle start (CYS), set read/write (R/W) to read, place the CPU space code on the function code lines (FC 0, FC 1 and FC2), place the CPU IACK code on ADDR 19-AADR 16 and place the interrupt level on ADDR 3-ADDR 1. The address strobe ($\overline{AS}$) is precharged by the IMB logic. At the beginning of the bus state 1 CPU 12 asserts $\overline{AS}$ and stops driving CYS, ADDR and the function code lines. The signals are held in a valid state by the IMB logic. All modules that issued an interrupt start comparing the interrupt level returned by CPU 12 to their own interrupt during this tic.

State I22, I23, I24 and I25 tics are special bus states for interrupt arbitration. At the beginning of the state I22, CPU 12 stops driving $\overline{AS}$. All modules that issued an interrupt request, latch the interrupt level returned by CPU 12. If a module's interrupt level matches the interrupt level returned by CPU 12, the module starts interrupt arbitration by asserting the most significant bit (MSB) of its interrupt arbitration number (bit 3) on $\overline{IARB0}$. In this description the term "assert" means that a signal is driven to its active or true state, irrespective of that state being represented by a high or low voltage level. At the beginning of the state I23, all modules that are arbitrating stop driving $\overline{IARB0}$ and any still arbitrating for interrupt assert (bit 2) on $\overline{IARB1}$. $\overline{IARB0}$ is precharged by the IMB logic. At the beginning of the state I24, all modules that are arbitrating stop driving X TO($\overline{IARB1}$) and any modules still arbitrating for interrupt assert (bit 1) on $\overline{IARB0}$. $\overline{IARB1}$ is precharged by the IMB logic. At the beginning of the state I25, all modules that are arbitrating stop driving $\overline{IARB0}$ and any modules still arbitrating for interrupt assert the least significant bit (LSB) of their interrupt arbitration number (bit 0) on $\overline{IARB1}$. $\overline{IARB0}$ is precharged by the IMB logic.

At the beginning of state tic 2 (second tic 2 from the left in FIG. 3), a data strobe ( X TO($\overline{DS}$)) is asserted. Any module that is arbitrating stops driving $\overline{IARB1}$ and waits for bus state 3. If $\overline{DS}$ remains negated, the bus cycle goes to a wait state 2* and then returns to state 2, where $\overline{DS}$ is again sampled. $\overline{IARB1}$ is precharged by the IMB logic. At the beginning of the state 3 tic, the master stops driving $\overline{DS}$. The signal is held in a valid state by the IMB logic. The module that won the interrupt arbitration asserts either $\overline{DTACK}$ or $\overline{AVEC}$. $\overline{DTACK}$ and $\overline{AVEC}$ are sampled on the falling edge of CLK at the end of the state 3. If $\overline{DTACK}$ is asserted, then the vector will be driven onto the data bus on bus state 4 and the IACK cycle is terminated. If $\overline{AVEC}$ is asserted, the bus cycle goes to state 4 and completes the cycle. If $\overline{DTACK}$ or $\overline{AVEC}$ remain negated, the bus cycle goes to a wait state 3* and then returns to state 3 where $\overline{DTACK}$ and $\overline{AVEC}$ are again sampled.

Figure 4:
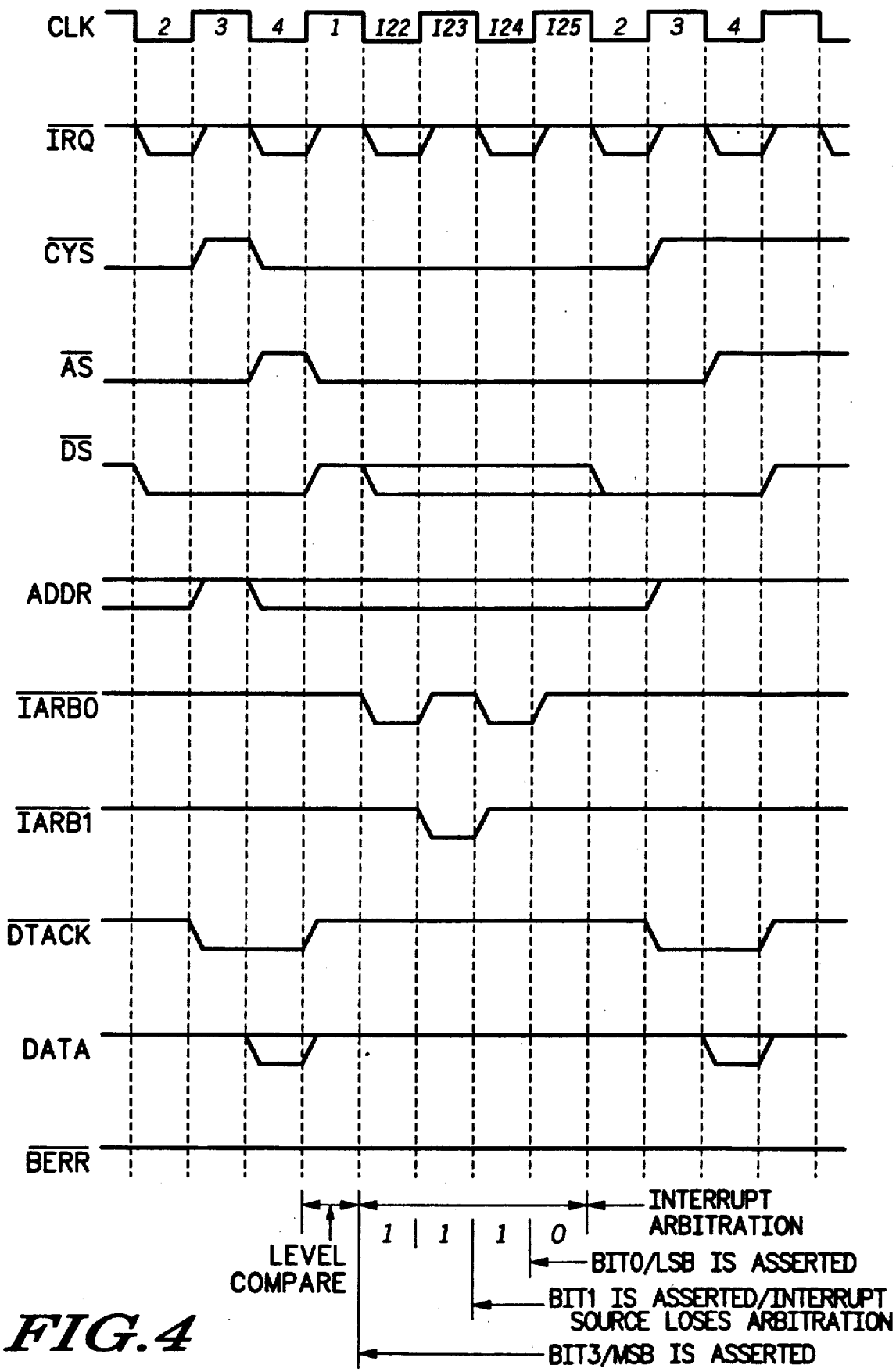
FIG. 4 is a timing diagram illustrating a specific interrupt acknowledge cycle with the specific arbitration involved.

FIG. 4 illustrates, as an example, an interrupt arbitration between a module having an arbitration number 14 and a module having an arbitration number 12. Again the arbitration takes place during tic I22 through I25. Since number 14 is three "ones" and a "zero" and number 12 is two "ones" and two "zeros", the module having the 12 arbitration number loses the arbitration during tic I24. The important fact to note in this explanation of the arbitration is that arbitration is completed in four tics, or two clock cycles.

Figure 5:
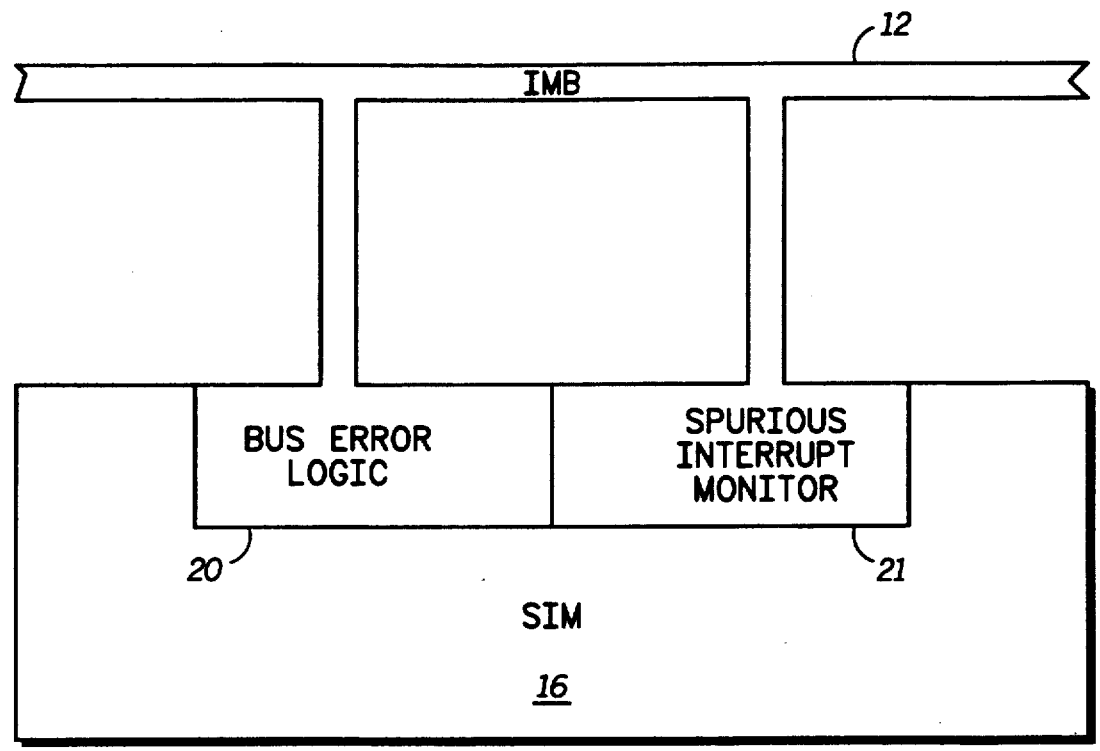
FIG. 5 is a block diagram illustrating the bus error logic and spurious interrupt monitor portions of the apparatus of FIG. 1.

FIG. 5 illustrates a portion of SIM 16 in greater detail. Among other functions, SIM 16 includes bus error logic 20 and spurious interrupt monitor 21. Both of these portions are connected to certain signals of IMB 12. Bus error logic 20 monitors every bus cycle of IMB 12. After a bus cycle is initiated, bus error logic 20 waits a programmable length of time for a termination of that bus cycle. If no termination occurs, then bus error logic 20 asserts the $\overline{BERR}$ signal. The bus master which initiated the cycle, typically CPU 11, can then respond appropriately, typically by initiating exception processing. Since the interrupt acknowledge cycle described in detail above is simply an example of a bus cycle of IMB 12, bus error logic 20 would terminate interrupt acknowledge cycles caused by spurious interrupts eventually. However, the time which logic 20 waits before asserting the $\overline{BERR}$ signal, although appropriate for most bus cycles, is much longer than is necessary to identify spurious interrupt acknowledge cycles. This is because of the fact that a failure of some interrupt source to arbitrate during an interrupt acknowledge cycle can be detected very quickly.

Therefore, spurious interrupt monitor 21 is provided. Monitor 21 responds only during the interrupt arbitration portion of an interrupt acknowledge cycle and asserts the $\overline{BERR}$ signal if no arbitration takes place. This can be detected within just a few clock cycles, as opposed to as many as 64 clock cycles in the case of the bus error logic.

Figure 6:
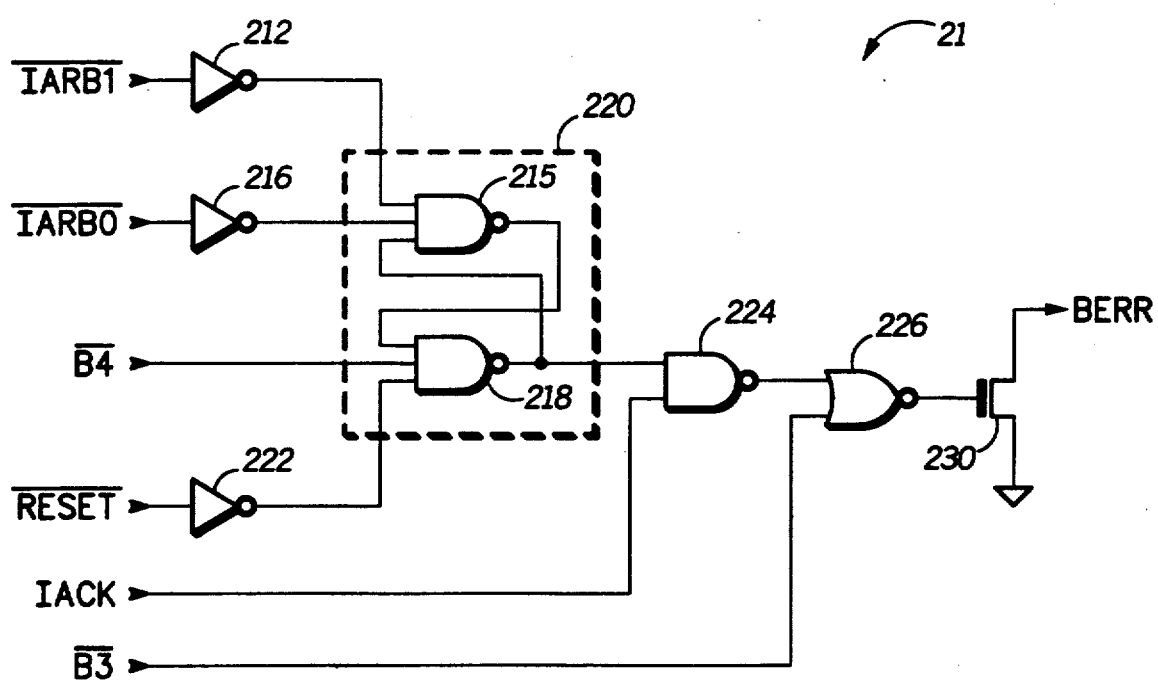
FIG. 6 is a schematic diagram of interrupt monitoring apparatus embodying the present invention.

Referring to FIG. 6, a spurious interrupt monitor 21 is illustrated Monitor 21 is connected to the IARB0 and IARB1 lines, the RESET line, the IACK line and the CLK line for receiving tics 3 (B3) and 4 (B4). FIG. 6 illustrates monitor 21 in schematic form and will be referred to for a more detailed description. An inverted IARB1 signal is applied through a buffer/inverter 212 to a first input of a three input NAND gate 215. An inverted IARB0 signal is applied through another buffer/inverter 216 to a second input of NAND gate 215. The third input of NAND gate 215 is connected to the output of a second three input NAND gate 218. The output of NAND gate 215 is connected to a first of the three inputs of NAND gate 218. Thus, NAND gates 215 and 218 are connected to form a latch 220. A second input of NAND gate 218 is connected to receive an inverted tic 4 (B4) thereon. The RESET signal is inverted by means of a buffer/inverter 222 and supplied to the third input of NAND gate 218. The output signal from NAND gate 218 is also supplied to a first input of a two input NAND gate 224. The second input of NAND gate 224 is connected to receive the IACK signal which indicates that an interrupt acknowledge cycle is taking place. The output from NAND gate 224 is connected to a first input of a two input NOR gate 226, the other input of which is connected to receive an inverted tic 3 (B3) thereon. The output of NOR gate 226 is connected to the gate of a FET 230, the drain and source of which are connected in series between ground and the BERR line.

In the operation of monitor circuit 21, the output of NOR gate 226 will be held low by input B3 throughout the IACK cycle except during tic 3. The output of NAND gate 224 is normally high but must be low during tic 3 or the output of NOR gate 226 will go high and turn on FET 230 indicating a bus error (BERR). During the IACK cycle, the IACK signal supplied to NAND gate 224 is high so that the output of latch 220 controls the circuit and is essentially an inhibit signal to prevent logic element 226 from automatically turning on FET 230 and producing a BERR signal. That is, if the output of latch 220 remains high (no arbitration), the output of NAND gate 224 remains low and FET 230 is turned on during tic 3 to indicate a spurious interrupt has occurred. If any arbitration occurs, i.e. either $\overline{IARB0}$ or $\overline{IARB1}$ go low (see FIG. 5), latch 220 changes state and the output thereof is driven low. Thus, the output of NOR gate 226 remains low during tic 3 and no spurious interrupt is indicated. Immediately following tic 3, tic 4 is applied to latch 220 to reset the latch and prepare the circuit for the next IACK cycle. It should be noted that the RESET signal can reset latch 220 and thereby cause the generation of a BERR signal during tic 3. Thus, if no arbitration is sensed by monitor 21 a bus error (BERR) is generated during tic 3 and the data processor can immediately proceed, rather than wait for the time-out timer to terminate the interrupt acknowledge cycle.

Thus, a new and improved method and apparatus for sensing spurious interrupt signals has been disclosed wherein a spurious interrupt is sensed within two clock cycles and a bus error signal is supplied to the data processor in the next tic. Since the prior structures had to wait for a time-out timer to expire, which time was typically 64 clock cycles, this is a substantial reduction in data processor latency. Further, by improving the data processor latency the efficiency and operation of the microprocessor system in real time and high noise environments is not only improved, but in many instances a previously impossible operation is rendered possible.

While we have shown and described a specific embodiment of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

We claim:

1. A microprocessor system comprising:
   a communication bus which performs a plurality of bus cycles, including interrupt acknowledge bus cycles;
   interrupt processing apparatus responsive to interrupt priority level signals carried by the communication bus;
   an interrupt arbitration apparatus responsive to interrupt arbitration signals carried by the communication bus;
   bus error means coupled to the communication bus for generating a bus error signal a predetermined length of time after a bus cycle has commenced unless one of one or more predetermined bus signals becomes active before the predetermined length of time has passed;
   first logic means coupled to the communication bus and to the bus error means for generating the bus error signal during a predetermined portion of interrupt acknowledge bus cycles, which predetermined portion occurs prior to expiration of the predetermined length of time, unless an inhibit signal is applied to an inhibit input of the first logic means prior to the predetermined portion of the interrupt acknowledge cycle; and
   second logic means coupled to receive the interrupt arbitration signals from the communication bus and having an output coupled to the inhibit input of the first logic means for producing the inhibit signal upon receiving any of the interrupt arbitration signals.

2. A microprocessor system according to claim 1 wherein the second logic means further comprises:
   a latch having inputs coupled to receive the interrupt arbitration signals.

3. A microprocessor system according to claim 2 wherein the interrupt arbitration signals are carried on multiple lines of the communication bus in bit-serial fashion and the latch further comprises:
   a set-reset latch having the interrupt arbitration signal connected to a reset input of the set-reset latch and a true output of the set-reset latch connected to the inhibit input of the first logic means.

4. A microprocessor system comprising:
   a communication bus;
   a central processing unit coupled to the communication bus and capable of operating the communication bus as a bus master to perform a plurality of bus cycles, including interrupt acknowledge bus cycles, the central processing unit is also responsive to interrupt priority level signals carried by the communication bus;
   an interrupt arbitration apparatus responsive to interrupt arbitration signals carried by the communication bus;
   bus error means coupled to the communication bus for generating a bus error signal a predetermined length of time after a bus cycle has commenced unless one of one or more predetermined bus signals becomes active before the predetermined length of time has passed;
   first logic means coupled to the communication bus and to the bus error means for generating the bus error signal during a predetermined portion of interrupt acknowledge bus cycles, which predetermined portion occurs prior to expiration of the predetermined length of time, unless an inhibit signal is applied to an inhibit input of the first logic means prior to the predetermined portion of the interrupt acknowledge cycle; and
   second logic means coupled to receive the interrupt arbitration signals from the communication bus and having an output coupled to the inhibit input of the first logic means for producing the inhibit signal upon receiving any of the interrupt arbitration signals.

5. A microprocessor system according to claim 4 wherein the second logic means further comprises:
   a latch having inputs coupled to receive the interrupt arbitration signals.

6. A microprocessor system according to claim 5 wherein the interrupt arbitration signals are carried on multiple lines of the communication bus in bit-serial fashion and the latch further comprises:
   a set-reset latch having the interrupt arbitration signal connected to a reset input of the set-reset latch and a true output of the set-reset latch connected to the inhibit input of the first logic means.

* * * * *